United States Patent
Fahrny et al.

(10) Patent No.: US 11,799,663 B2
(45) Date of Patent: *Oct. 24, 2023

(54) AUTHENTICATION AND BINDING OF MULTIPLE DEVICES

(71) Applicant: Comcast Cable Communications, LLC, Philadelphia, PA (US)

(72) Inventors: James W. Fahrny, Parker, CO (US); Kyong Park, Woodbine, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 622 days.

This patent is subject to a terminal disclaimer.

(21) Appl. No.: 17/006,035

(22) Filed: Aug. 28, 2020

(65) Prior Publication Data

US 2020/0403807 A1    Dec. 24, 2020

Related U.S. Application Data

(63) Continuation of application No. 14/243,362, filed on Apr. 2, 2014, now Pat. No. 10,790,985, which is a
(Continued)

(51) Int. Cl.
*H04L 9/32* (2006.01)
*H04L 9/40* (2022.01)

(52) U.S. Cl.
CPC ............ *H04L 9/3247* (2013.01); *H04L 63/08* (2013.01); *H04L 63/0884* (2013.01);
(Continued)

(58) Field of Classification Search
CPC ... H04L 9/3247; H04L 63/08; H04L 63/0884; H04L 63/102; H04L 63/105; H04L 63/126
See application file for complete search history.

(56) References Cited

U.S. PATENT DOCUMENTS 5,943,426 A * 8/1999 Frith ....................... H04L 69/04
713/153
7,895,445 B1   2/2011 Albanese et al.
(Continued)

FOREIGN PATENT DOCUMENTS

| JP | 2002281061 A | 9/2002 |
| WO | 0067415 A2 | 11/2000 |
| WO | 2004070588 A1 | 8/2004 |

OTHER PUBLICATIONS

Aug. 12, 2021—Canadian Office Action—CA 2,786,346.
(Continued)

*Primary Examiner* — Harris C Wang
(74) *Attorney, Agent, or Firm* — Banner & Witcoff, Ltd.

(57) ABSTRACT

Systems and methods are described that relate to authentication and/or binding of multiple devices with varying security profiles. In one aspect, a first device with a higher security profile may vouch for the authenticity of a second device with a lower security profile when the second device requests access for content from a content provider. The vouching process may be implemented by allowing the first device to overlay its digital signature on a registration request that has been signed and transmitted by the second device. The second device with the lower security profile may access content from the content provider or source for a predetermined time period, even when the second device does not access content through the first device.

20 Claims, 6 Drawing Sheets

Related U.S. Application Data continuation of application No. 13/211,603, filed on Aug. 17, 2011, now Pat. No. 8,732,475.

(52) U.S. Cl.
CPC .......... H04L 63/102 (2013.01); H04L 63/105 (2013.01); H04L 63/126 (2013.01)

(56) References Cited

U.S. PATENT DOCUMENTS

| | | | |
|---|---|---|---|
| 8,352,998 B1* | 1/2013 | Kougiouris | H04L 63/20 726/1 |
| 2003/0051169 A1* | 3/2003 | Sprigg | G06F 9/468 713/185 |
| 2003/0115267 A1 | 6/2003 | Hinton et al. | |
| 2004/0078573 A1* | 4/2004 | Matsuyama | H04L 63/0823 709/229 |
| 2005/0005126 A1 | 1/2005 | Zhang et al. | |
| 2005/0078681 A1 | 4/2005 | Sanuki et al. | |
| 2006/0010074 A1* | 1/2006 | Zeitsiff | H04L 63/062 705/52 |
| 2009/0029697 A1* | 1/2009 | Bianconi | H04W 8/20 455/432.3 |
| 2009/0165055 A1* | 6/2009 | Chaudhry | H04N 7/17318 725/54 |
| 2009/0298535 A1 | 12/2009 | Klein et al. | |
| 2010/0107234 A1* | 4/2010 | Aldor | G06F 21/64 726/9 |
| 2010/0122302 A1* | 5/2010 | Gerard | H04N 21/47202 725/87 |
| 2013/0067547 A1* | 3/2013 | Thavasi | G06F 21/32 726/7 |
| 2014/0136853 A1* | 5/2014 | Fukuda | H04L 63/205 713/189 |

OTHER PUBLICATIONS

Extended European Search Report—EP 12180390.2—dated May 13, 2013.
European Office Action—EP App 12180390.2—dated Jul. 19, 2016.
May 8, 2018—Canadian Office Action—CA 2,786,346.
Apr. 30, 2019—Canadian Office Action—CA 2786346.
Oct. 15, 2020, Canadian Office Action, CA 2,786,346.

* cited by examiner

AUTHENTICATION AND BINDING OF MULTIPLE DEVICES

CROSS-REFERENCE TO RELATED APPLICATIONS

This application is a continuation of U.S. patent application Ser. No. 14/243,362 filed Apr. 2, 2014, which is a continuation of U.S. patent application Ser. No. 13/211,603 filed Aug. 17, 2011, now U.S. Pat. No. 8,732,475, the entire disclosures of which are incorporated herein by reference.

FIELD OF THE DISCLOSURE

Some aspects of the disclosure presents methods and systems related to authentication and/or binding of multiple devices. Some aspects of the disclosure are related to associating two or more communication devices that may have varying security profiles.

BACKGROUND OF THE DISCLOSURE

The disclosure addresses security profiles, such as a security profile for a computing device that may control various aspects of access to content; for instance, the security profile may detail the strength of passwords, keys, and/or other hardware/software aspects that determine who can access a particular piece of content, and when, how, and where the content is accessible. For instance, a security profile may be as simple as requiring a single password of a predetermined strength (e.g., based on the length of the password, mixture of alphanumeric characters, etc.) to allow a user to access the computing device. In other cases, multiple passwords of a predetermined strength may be required (e.g., a password dynamically generated by a security token in addition to a standard static password) for access to the computing device. The security token may also store cryptographic keys (e.g., digital signatures, biometric data, etc.) that serve as authorization credentials. The security token itself may be tamper resistant and may require an additional personal identification number (PIN) to show an electronic key.

In yet other cases, the disclosure addresses the strength of a security profile associated with a computing device. The strength of a security profile may relate to where authentication credentials are stored within the memory of a secure computing device. In these cases, the ease with which the authentication credentials may be accessed and modified may ultimately determine the strength of the security profile.

Personal computers (PCs) and many mobile devices have security profiles that are considered somewhat less secure than devices such as, for example, digital set-top boxes for cable, satellite, and Internet Protocol television (IPTV) systems. Different device classes (e.g., PC versus set top box) may have distinct security capabilities. For example, the PC hardware platform may have no inherent security features. In contrast, the set-top box may be manufactured with special purpose security hardware. Moreover, the user experience anticipated by each device may also limit security capabilities. For example, a set-top box user may not be expected to repeatedly input user credentials. The combination of these and other factors may result in disparate security challenge mechanisms and capabilities resulting in a corresponding set of security profiles. The security profile assigned to a device may lend itself to the quality and integrity of the security services delivered by the device. For example, the security features in a set-top box may be far superior to security features in a PC and, therefore, trust in a device's capability to deliver content as planned by deterring abuse may vary.

Pursuant to the disclosure, some devices have lower security profiles for a variety of reasons having to do with how easily hacked the device is, including the fact that many of the cryptographic security keys associated with the device may not be adequately protected because they are stored in random access memory (RAM), the certificates may be burned into read-only memory (ROM), the media access control (MAC) address may be easily modified, there are no hardware roots of trust or any method to store a key and identity securely, and/or the devices may be susceptible to large-scale cloning. For example, PCs and other devices may lack hardware security features accessible to third-party application developers targeting those devices. In fact, most PCs may lack hardware security systems and, therefore, persistent and volatile storage components may be rooted in protection mechanisms that may have weak resistance to reverse engineering. Meanwhile, some mobile phones may possess strong hardware cryptographic modules. However, access to these modules by third-parties may be non-existent, inferior, or hidden from user-space interfaces. One of the highest priorities for content distribution systems is to ensure that devices logging in to a customer account are paying for services and not stealing these services. With the less secure profiles of devices such as those mentioned above, ensuring that each user is obtaining legitimate services is very difficult to do, especially without a national billing and account management system. In fact, as mentioned above, many consumer devices may be easily cloned and run on someone else's account in a different part of the country when the billing system and account management are different entities.

Therefore, improved and/or alternative methods/systems are needed to enable devices to access content.

BRIEF SUMMARY OF THE DISCLOSURE

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

To overcome limitations in the prior art, and to overcome other limitations that will be apparent upon reading and understanding the present specification, the present disclosure is directed to a method and system for securely authenticating and binding two or more devices that have varying security profiles such that a higher security profile device can vouch for one or more lower security devices.

Aspects of the disclosure relate to a system/method in which a device may act as a registration or authentication proxy for other clients that need to make requests for content to a network activation service.

Aspects of the disclosure may be provided in a computer-readable medium having computer-executable instructions to perform one or more of the process steps described herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION OF THE DISCLOSURE

Figure 1:
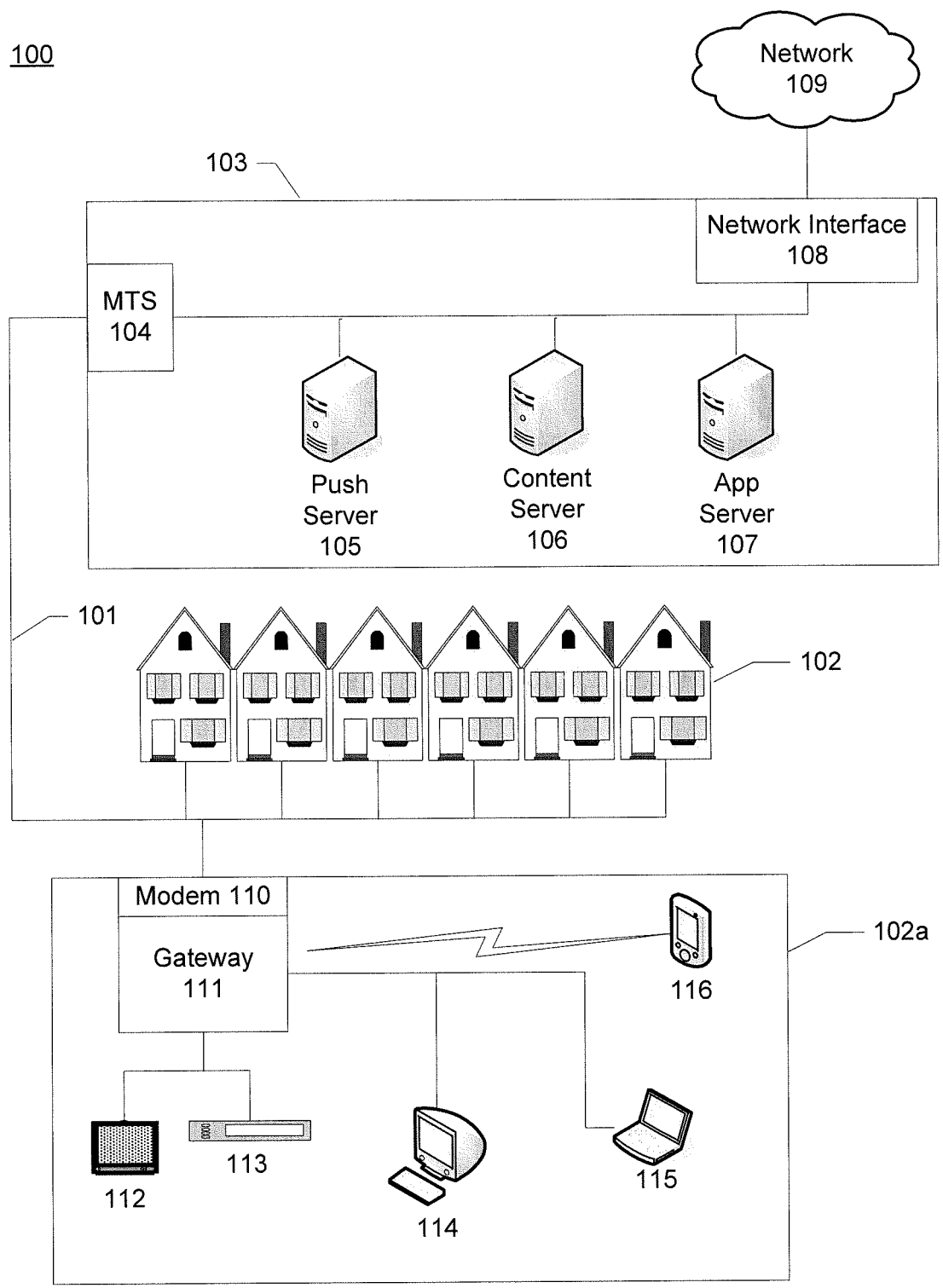
FIG. 1 illustrates an example information access or distribution network.

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

As mentioned above, there are problems associated with ensuring that content is appropriately communicated to and accessed by multiple devices within a client network. In this regard, content may include any type of information, including video, audio, data, e-books, financial data, etc., or a combination of more than one type.

In certain aspects, the present disclosure recognizes that different devices may have different security profiles. For instance, one device (e.g., a gateway) may have a stronger security profile and a second device (e.g., a smart phone) may have a weaker security profile. In particular, a first device may have an inferior security architecture that results in the weaker security profile while another device within its vicinity may have an adequate security architecture that results in the stronger security profile. Therefore, the device with the inferior security architecture may use the security services of the device with adequate security architecture (e.g., a trustworthy device) to imply proximity with the trustworthy device. Services may then make a stronger inference regarding the authenticity and context (e.g., geographic placement in the vicinity of the device with an adequate security architecture, etc.) of the device with the inferior security architecture.

If it is also desirable to bind two or more devices, binding of the devices may occur in any direction. Ultimately, the security services of a trustworthy device may be leveraged by other devices in order to imply use by a common owner. In other words, the trustworthy device may either act in the role of proxy by securely tunneling data between another device and a content service or another device may acquire fresh challenge/response data from the trustworthy device and then deliver this output to the content service. Due to the flexibility of the message architecture, several device combinations may be realized including low-security device and gateway (e.g., as proxy), low-security device and gateway (e.g., as secure provider), low-security device and set-top box, and low-security device and smartphone with hardware support.

In general, the security profile of a device may control various aspects of access to content; for instance, the security profile may detail the strength of passwords, keys, and/or other hardware/software aspects that determine who access a particular piece of content, and when, how, and where the content is accessible.

In accordance with some aspects of the disclosure, a client device (e.g., a smart phone) may want to request to be registered and/or activated on a network to receive services such as those related to video-on-demand. If the smart phone does not possess an adequate threshold level of security (e.g., as required by the content provider), the smart phone may make a request through a stronger security device such as a gateway, which does possess at least the minimum level of security (as defined by its security profile). The smart phone may initially digitally sign and transmit a request for network activation to the gateway device. Once the gateway confirms that the smart phone is an authorized device, the gateway may apply a second digital signature to the smartphone request and then transmit the appropriate request to a network activation service, thereby vouching for the smart phone. The network (e.g., a video-on-demand content provider or a secure data provider) may then make its own independent check as to the authenticity of the gateway and, if authenticated, the video-content provider may activate the smart phone so that the smart phone may access video-on-demand content. In this example, because the gateway possesses the minimum security profile, the gateway may have direct access to the network (e.g., video content provider). Likewise, because the smart phone does not possess the minimum security profile, the smart phone may not have direct access to the content (e.g., high value or secure content).

To authenticate a weaker security device, a stronger security device may digitally sign an activation request (e.g., a second time) that has already been signed by a weaker security device. This activation request may then be forwarded to a network activation or authentication service, for example, and the identities of both the stronger security device and the weaker security device may then be validated. The network service may already possess identity information of the stronger security device (e.g., through a registration process at the time of manufacture, through an initialization process upon first use, etc.). While the network service may not directly possess identity information related to the weaker security device, the signature of the stronger security device on the activation request may be used by the network service as an identity credential to allow the weaker security device to access content. For instance, in the previous example of a smart phone seeking access to a high value video-on-demand service through a gateway, the smart phone may digitally sign and transmit an activation request to the gateway. The gateway may then verify the authenticity of the smart phone (e.g., again through a registration process at the time of manufacture, through an initialization process upon first use, etc.), and if the gateway determines that the smart phone should have network access, the gateway may in turn digitally sign and transmit the authentication request to the video content provider. The content provider, or data manager such as a security provider, may then determine the authenticity of the gateway, and if the video content provider determines that the gateway is authentic, the network activation service may transmit access authorization credentials for the smart phone to the gateway. The gateway may then transmit these credentials to the smart phone so that the smart phone may access, e.g., video-on-demand content from the provider. These credentials may have an expiration of a few hours, a day, a week or a month depending on the content policy. After expiration of these credentials, the weaker device may be required to re-register or re-authenticate through the stronger security device to obtain a new set of credentials. The stronger device thus may act as a security and/or registration proxy for the weaker security device. Similarly, the stronger device may act as a security and/or registration proxy for other client devices that need to make activation requests to the network activation service.

This method of securely authenticating and/or binding devices with different security profiles may have significant value to those delivering or providing access to content, such as multi system operators (MSOs), by allowing users to potentially consume content on many new devices such as PCs, MACs, cell phones, portable media devices, electronic pads, televisions with network connectivity, etc. which may not possess adequate security profiles. This increase in the number of content consumption device options may lead to an increase in revenue. Also, the ability for certain devices to serve as a security/registration proxy for other devices may lead to new business models for video content as new services may be provided to less secure devices.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple homes 102 to a central office (which can be a local headend) 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. Although the term home is used by way of example, locations 102 may be any type of user premises, such as businesses, institutions, etc. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate content delivery devices through a registration process, validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, ASP, .NET, perl, python, ruby with JEE/J2EE, ITS, apache). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And another application server may be responsible for receiving user remote control commands, and processing them to provide an intelligent remote control experience.

An example home 102a may include a device 110, such as a modem, which may include transmitters and receivers used to communicate on the lines 101 and with the central office 103. The device 110 may be, for example, a coaxial cable modem (for coaxial cable lines 101), a fiber interface node (for fiber optic lines 101), or any other desired modem device. The device 110 may be connected to, or be a part of, a gateway interface device 111. The gateway interface device 111 may be a computing device that communicates with the device 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

In accordance with one aspect of the disclosure, devices 110-116 may possess varying security profiles. The security profile of devices 110-116 may be determined by various factors, including the strength (e.g., as determined by the length and/or sequence of alphanumeric characters) of passwords used to access the devices 110-116, the implementation and/or location of cryptographic keys (e.g., digital signatures, biometric data, etc.) within the device 110-116 (e.g., in RAM, ROM, other internal registers, etc.), and the use of a multifactor authentication schemes to access devices 110-116 (e.g., use of a keyed password and biometric data for access authorization), among other things. In other aspects, a security profile may also be determined by the strength of encryption/decryption algorithms used by the device 110-116 to transmit/receive data (e.g., symmetric/asymmetric keys, etc.), by the strength of encrypted seed values, by the structure (e.g., mechanical features such as tamper-resistant protective covers, etc.) of the devices 110-116, and/or by the physical address where the device 110-116 is located (e.g., devices located in high crime versus low crime areas, fixed devices versus mobile devices, etc.). For instance, STBs 113 may have a stronger security profile than wireless devices 116, meaning that the STBs 113 may implement a security profile (e.g., computer-executable program instructions that control access to content, encryption of content, personalized commands, etc.) that is stronger (e.g., tougher to hack) than wireless devices 116 (e.g., a smart phone). In another embodiment, devices 110-116 may possess security profiles that may be rated on a graded scale from least secure to most secure.

Figure 2:
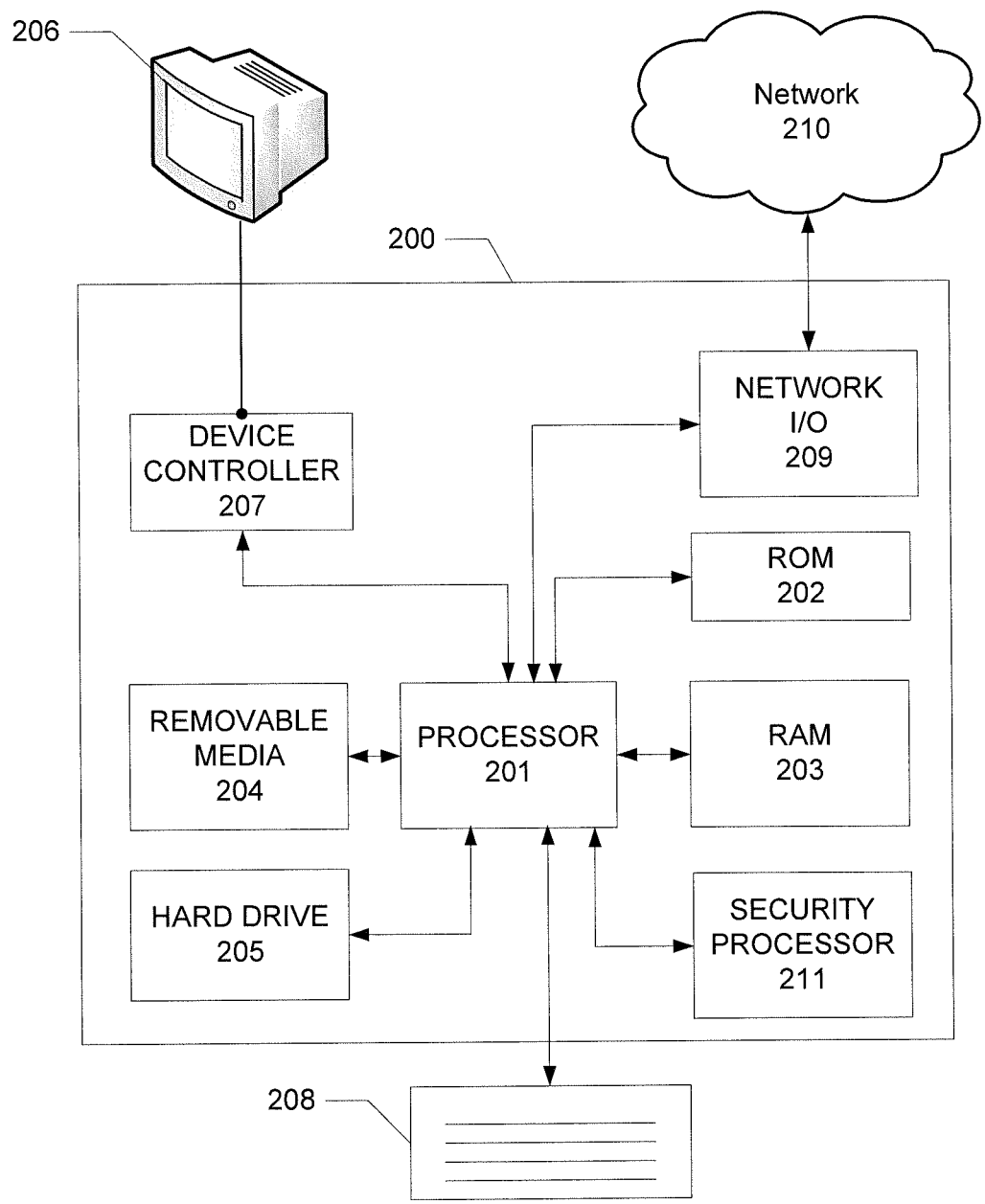
FIG. 2 illustrates an example hardware platform on which various elements described herein can be implemented.

FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. In some embodiments, these instructions may specify the security profile associated with devices 110-116. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces (e.g., a communication module), such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network. Computing device 200 may also include a security processor 211 that defines a security profile associated with device 200. The security profile defined by processor 211 may be strong or weak depending on, for example, how easily one may compromise the access, encryption, and/or authorization of services associated with the device 200. For instance, a lower security profile defined by security processor 211 may be a result of device 200 having cryptographic keys stored in RAM 203 and/or having software obfuscation of the cryptographic keys, etc.

Various features described herein offer binding of security profiles associated with devices 110-116 so that users may access content from the central office 103 or another content storage facility or location. In certain aspects, the binding of security profiles may allow a weaker device 110-116 to use the security privileges associated with a stronger device 110-116. For example, one such user may be a viewer who is watching a television program being transmitted from the central office 103. In some embodiments, as discussed previously, the user may be able to view content from a device that has a weaker security profile (e.g., a smart phone) through a registration process for authenticating the smart phone with a device that has a stronger security profile (e.g., a gateway 111).

Figure 3A:
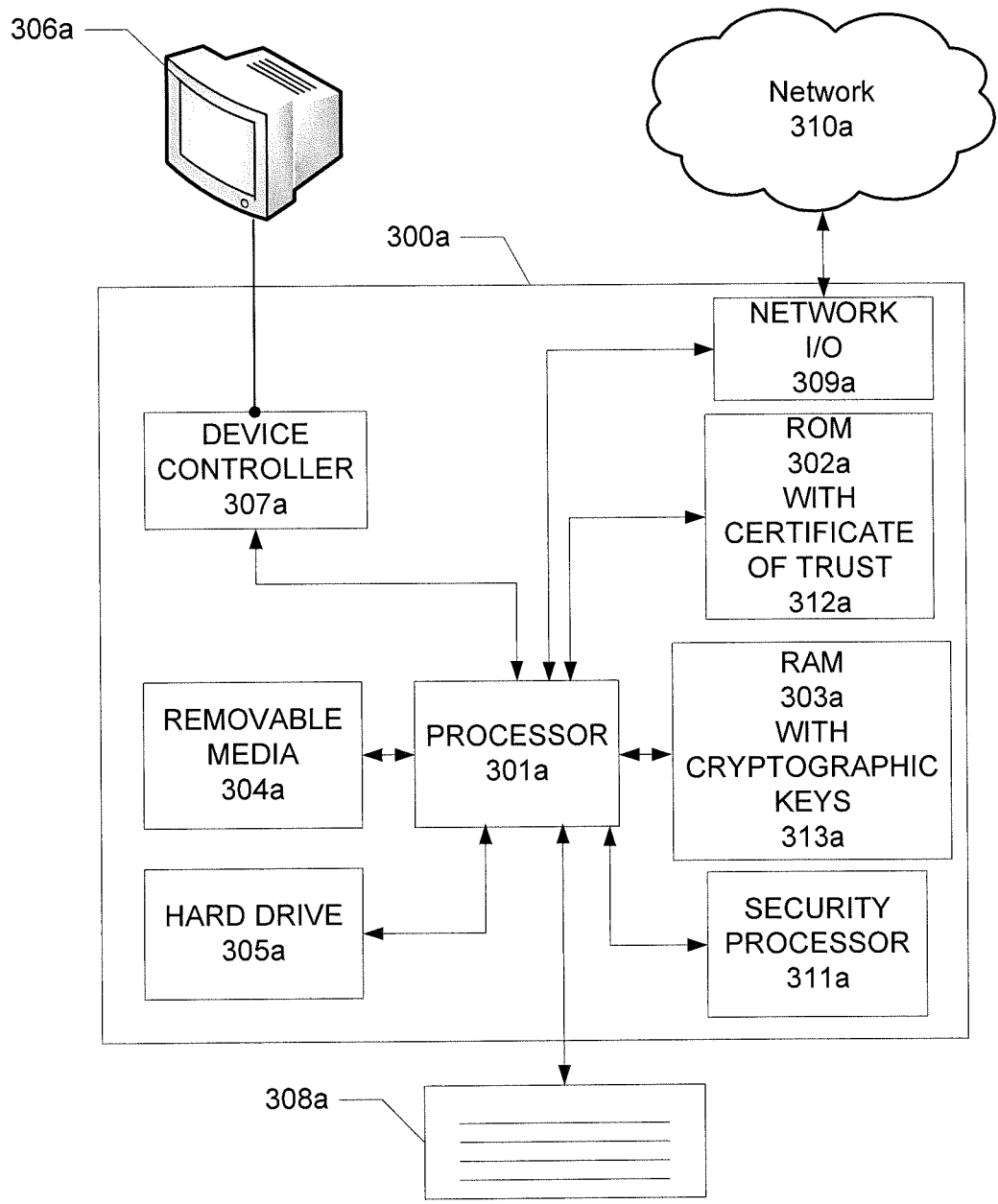
FIG. 3a illustrates some of the general elements of a computing device with a weak security profile in accordance with various aspects of the disclosure.

FIG. 3a illustrates some of the general elements of a computing device 300a with a weak security profile in accordance with at least one aspect of the disclosure. The computing device 300a shown in FIG. 3a may have many of the same features as device 200 shown in FIG. 2. For instance, device 300a may include processor 301a, ROM 302a, RAM 303a, removable media 304a, hard drive 305a, output device 306a, output device controller 307a, input device 308a, network interface (e.g., a communication module) 309a, and security processor 311a. Computing device 300a may also be in communication with a network 310a through network interface 309a. These components of device 300a may function in a similar way to the corresponding features of device 200. The weaker security profile of device 300a may be manifested in storage of certificates of trust 312a (e.g., X.509, etc.) within ROM 302a and/or cryptographic keys 313a (e.g., trusted root public keys, public key infrastructure (PKI), etc.) within RAM 303a. For instance, storage locations for secrets unique to the device 300a or a user of device 300a may be stored in memory and/or a file system. In general, device 300a may have a weaker security profile for a variety of reasons; for instance, the identity information of device 300a may not be burned into a one-time programmable set of bits, the cryptographic keys used by device 300a may be transmitted as software parameters that may be intercepted, the cryptographic keys may be available on the general purpose processor, the cryptographic keys may be obfuscated with products that merely obfuscate the image and break the keys into segments that are still stored in RAM, and/or the identity information of device 300a may be hardware-based but still unsecure. In addition, as mentioned earlier, device 300a may have alternative or additional features that may render the security profile of device 300a to be weaker. For instance, the media access control (MAC) address of device 300a may be easily modified and/or the device 300a may be susceptible to being hacked or cloned in other ways.

Figure 3B:
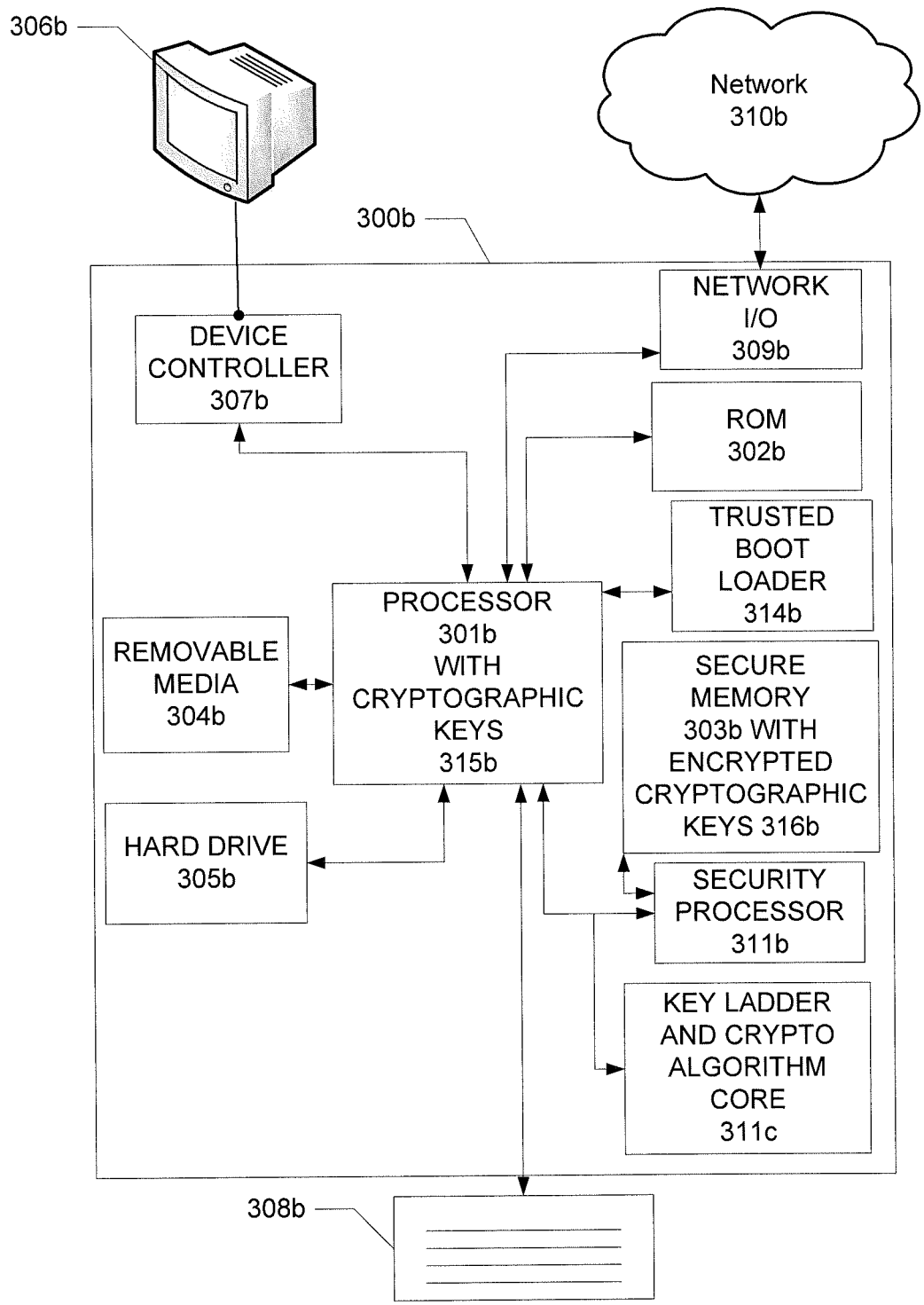
FIG. 3b illustrates some of the general elements of a computing device with a stronger security profile in accordance with various aspects of the disclosure.

FIG. 3b illustrates some of the general elements of a computing device 300b with a stronger security profile in accordance with at least one aspect of the disclosure. The computing device 300b may be a part of one device, e.g., a smartphone, or multiple devices. The computing device 300b shown in FIG. 3b may also have many of the same features as device 200 shown in FIG. 2. For instance, device 300b may include processor 301b, ROM 302b, secure memory 303b, removable media 304b, hard drive 305b, output device 306b, output device controller 307b, input device 308b, network interface (e.g., a communication module) 309b, and security processor 311b. The security processor 311b may interface with a key ladder and crypto algorithm core 311c. The key ladder and crypto algorithm core 311c may allow for the encrypting and/or decrypting of keys/content streams without accessing the key material directly (e.g., to avoid overuse of any one key, etc.). Computing device 300b may also be in communication with a network 310b through network interface 309b. These components of device 300b may function in a similar way to the corresponding features of device 200. The stronger security profile of device 300b may be manifested in a variety of ways; for instance, device 300b may include a trusted boot loader 314b, device 300b may the store cryptographic keys 315b in an internal processor 301b or internal register, and/or device 300b may store strongly encrypted cryptographic keys 316b in secure memory 303b. In addition, device 300b may include interfaces such as application programming interfaces (APIs) exposed to another device for using/exercising cryptographic secrets without exposing cryptographic secret content. In general, device 300b may have a stronger security profile because the cryptographic keys and identity information of device 300b may be stored in internal one-time programmable bits, device 300b may implement code-signing processes so that all the executable code on device 300b can be loaded only if the code is signed with a signature that is managed by the entity that is putting the code (including applications) on the device 300b, device 300b may include a hardware key ladder such that any key or content that is decrypted on device 300b is done internally and is hardware-based via decryption locks, and/or device 300b may include a trusted boot loader 314b such that any time device 300b is powered up, the trusted boot loader 314b may validate all the pieces in the internal ROM 302b and when the device 300b attempts to obtain firmware and software updates, the trusted boot loader 314b may validate all of the updates through a signature chain that the trusted boot loader 314b manages internally. In addition, device 300b may have alternative or additional features that may render the security profile of device 300b to be stronger.

The components illustrated in the figures herein are merely examples, and can be altered, combined, subdivided, in any desired manner to still achieve results described herein. Moreover, the devices shown in FIGS. 2, 3a, and 3b may be portable, stand-alone, or spread across multiple devices, etc.

In certain aspects of the disclosure, a client device 110, 112-116 may come onto a network and may need to register with a customer account that has already been created before the device 110, 112-116 may navigate any content. In particular, registering with a customer account may include use of the customer account's credentials by the client device 110, 112-116 to log in to the network. The device 110, 112-116 may be personalized through a service (e.g., from central office 103) that transmits a personalization response that may include access authorization credentials (e.g., cryptographic "keys") and identity information that ties the client device 110, 112-116 to a particular customer account (e.g., established from information at a service provider, established through a preregistered gateway 111 with a higher security profile, etc.).

It should be noted that any of client devices 110-116 may represent a device with a higher security profile (e.g., the preregistered gateway 111) and any of the remaining client devices 110-116 may represent a device with a lower security profile. For instance, if modem 110 and/or STB 113 has an adequate security profile (e.g., sufficient to allow access to a particular piece of requested content from central office 103), the modem 110 and/or STB 113 may also function as a gateway 111. In particular, as mentioned earlier, cable modem 110, may implement a higher security profile through features such as a trusted boot loader, a hardware root of trust where cryptographic keys may be stored in a trusted internal processor, an internal register storing the cryptographic keys when the cable modem 110 boots, and/or an encrypted internal key that is not exposed if the cryptographic keys are put in RAM. However, throughout the remainder of the disclosure, unless specifically stated otherwise, the gateway 111 may be used to represent a device with a higher security profile and the other client devices 110, 112-116 may all have lower security profiles than gateway 111. Therefore, in general, gateway 111 is assumed to already possess its registration details whereas the remaining devices 110, 112-116 are discussed to explain how the registration process works via preregistered gateway 111. Because of its higher security profile, gateway 111 may serve as a hardware root of trust and may not have to register through yet another device 110-116 when accessing content from a content provider such as central office 103. On the other hand, client devices 110, 112-116 may have varying security profile levels that make them more susceptible to being hacked.

The identity information received by client devices 110, 112-116 through the registration process may be a globally unique identifier that may have a component of the identity that ties the devices 110, 112-116 to a particular customer account (e.g., associates the identifier stored in a database maintained, for example, by central office 103, with the customer account) through which devices 110, 112-116 are registering (e.g., established via the preregistered gateway 111 that may vouch for the security profile of device 110, 112-116 for viewing content). The keys may associate a device 110, 112-116 to a particular customer account and may include credentials that device 110, 112-116 may use to digitally sign requests for access to content. The keys may also be session keys useful for exchanging secure information at a later time (e.g., a preshared key).

The client devices 110-116 may have a unique device ID that may be created from the configuration on the device 110-116 (e.g., media access control (MAC) address, etc.). Devices 110, 112-116 may also acquire software/program instructions to complete a registration process with gateway 111, if the software is not already present on devices 110, 112-116. The software may allow the devices 110, 112-116 to sign and transmit registration requests using one or more preshared keys and may give the devices 110, 112-116 information regarding how to complete the registration process. The keys may be preshared on a network (e.g., network 109) and/or in a manufacturing process, etc. depending on the type of device 110, 112-116. Also, it should be noted that the keys may include asymmetric keys (e.g., with a hash) and/or a hash-based message authentication code (HMAC) with a symmetric key.

The gateway 111 may have a deep level of hardware root of trust, security that is identified through strong identification methods, and may be associated directly with a user account. The security profile of gateway 111 may serve as an anchor in a given location 102 and may be able to monitor activity of all of other client devices 110, 112-116 and may be able to vouch (e.g., for a predetermined period of time such as a day, week, month, etc.) for devices 110, 112-116 that may possess less secure security profiles when the devices 110, 112-116 may be trying to access content from central office 103.

Figure 4:
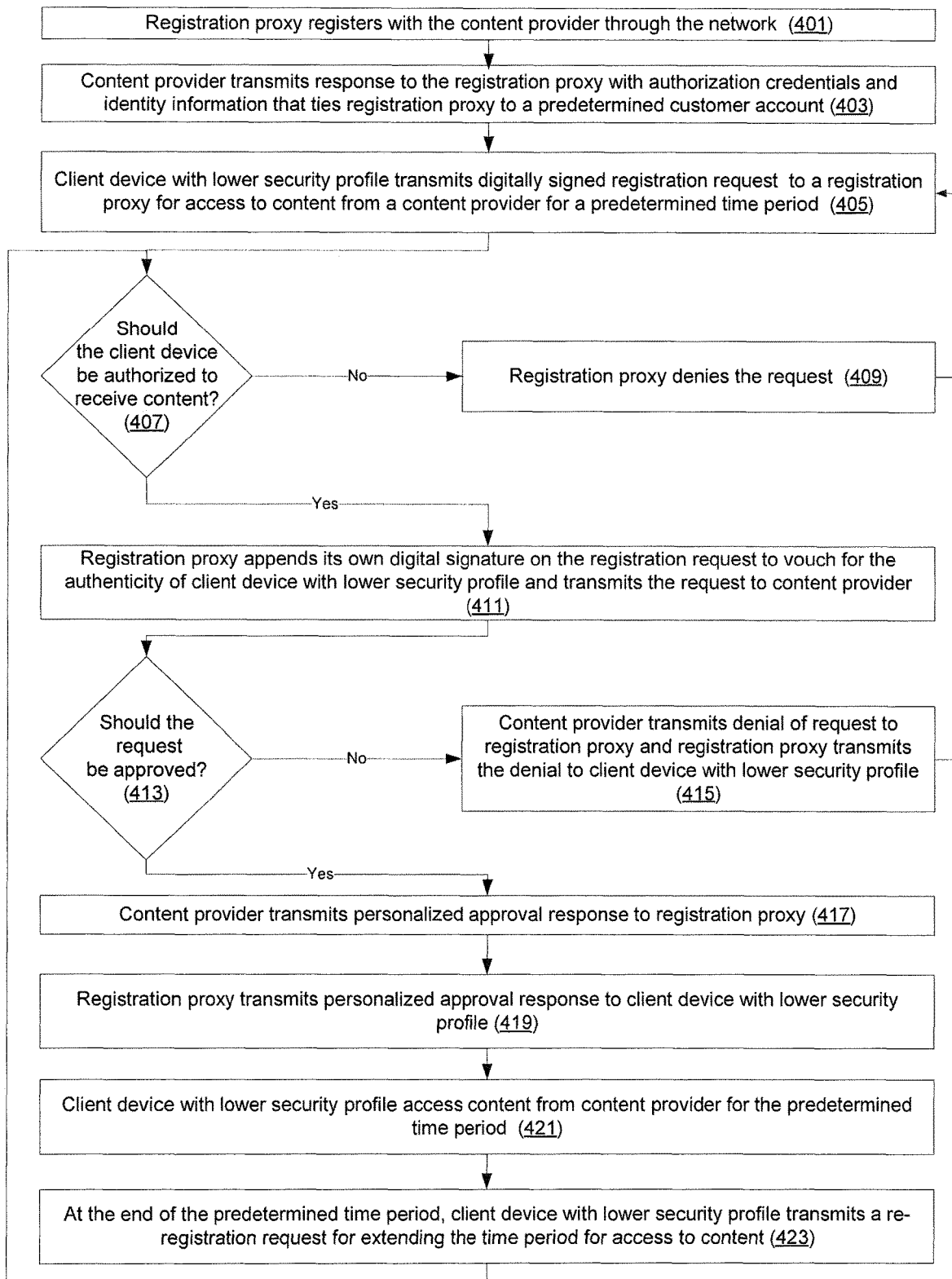
FIG. 4 shows a flow diagram of a device authentication and/or binding process in accordance with various aspects of the disclosure.

FIG. 4 shows an example flow diagram of a device authentication and/or binding process in accordance with at least one aspect of the disclosure. The process may start out at step 401 where a registration proxy (e.g., gateway 111) may register with a content provider (e.g., central office 103) through a network using a strong hardware based authentication protocol. The process may then move to step 403 where the content provider may transmit a response to the registration proxy 111 with authorization credentials and identity information that associates the registration proxy 111 with a predetermined customer account, as described earlier, for example. Upon completion of this step, the registration proxy (gateway) identity is stored in the user account as one of the devices assigned to the customer.

Next, the process may move to step 405 where a client device 110, 112-116 may initially transmit to the registration proxy 111 a request, such as a digitally signed request, for access to content from the content provider. For instance, a smart phone 116 may transmit a digitally signed registration request to a gateway 111. This signed request may be a request for access to content, for example, for a predetermined period of time. The process may then move to decision step 407 where the registration proxy 111 may decide if the client device 110, 112-116 should be authorized to receive content. If not, the registration proxy 111 may deny the request in step 409. The process may then move back to step 405. If the registration proxy 111 decides that the client device 110, 112-116 should receive content, the registration proxy 111, in step 411, may then append, supplement, and/or overlay its own digital signature to the request, which already includes the digital signature of client device 110, 112-116. The registration proxy 111 may then transmit the doubly-signed request to the content provider. The digital signature of the registration proxy 111 may signify that registration proxy 111 "knows" the client device 110, 112-116 and is vouching for the device 110, 112-116 to be able to obtain content from a predetermined content provider.

The process may then move to step 413 where the content provider may decide if the registration request should be approved. If the request should not be approved, the content provider may transmit a denial of the request to registration proxy 111, which may pass the denial down to client device 110, 112-116 in step 415. The process may then move back to step 405. If the registration request is approved by the content provider, the process may move to step 417 where the content provider may transmit a personalized approval response (e.g., including access authorization credentials and identity information) to the registration proxy 111. The authorization credentials may be digitally signed by the content provider and may provide client device 110, 112-116 with a new security profile level, an expiration time, and the types of content that may be requested before the expiration time. The registration proxy 111 may then transmit the personalized approval response to the client device 110, 112-116 in step 419. Then, in step 421, device 110, 112-116 may access content from the content provider for a predetermined amount of time (e.g., as specified in the initial registration request) even when the device 110, 112-116 is not behind gateway 111 at location 102, as long as the identity of device 110, 112-116 has not changed. For instance, if the client device 110, 112-116 is a smart phone 116, the smart phone 116 may access video-on-demand content from central office 103. However, when the device 110, 112-116 is behind registration proxy 111, the registration proxy 111 may continue to monitor the activity of device 110, 112-116 even after the registration request of device 110, 112-116 has been approved by a content provider. In this way, devices 110, 112-116 may function as tethered devices that may be registered through an anchor of trust (e.g., registration proxy 111).

Then, as shown in step 423, at the end of the predetermined access period, the client device 110, 112-116 may have to re-register with the registration proxy 111 to continue to access content from the content provider by transmitting a re-registration request for extending the time period for accessing the content. The process may then move back to step 407 where the re-registration request may be processed by the registration proxy 111 and the content provider. This re-registration process may not be as extensive as the initial registration and may include a "stamp" provided by registration proxy 111 on the request for content by a client device 110, 112-116. If this re-registration process is approved by registration proxy 111 and the content provider, client device 110, 112-116 may receive content again for a predetermined time period, as specified in the re-registration request.

Figure 5:
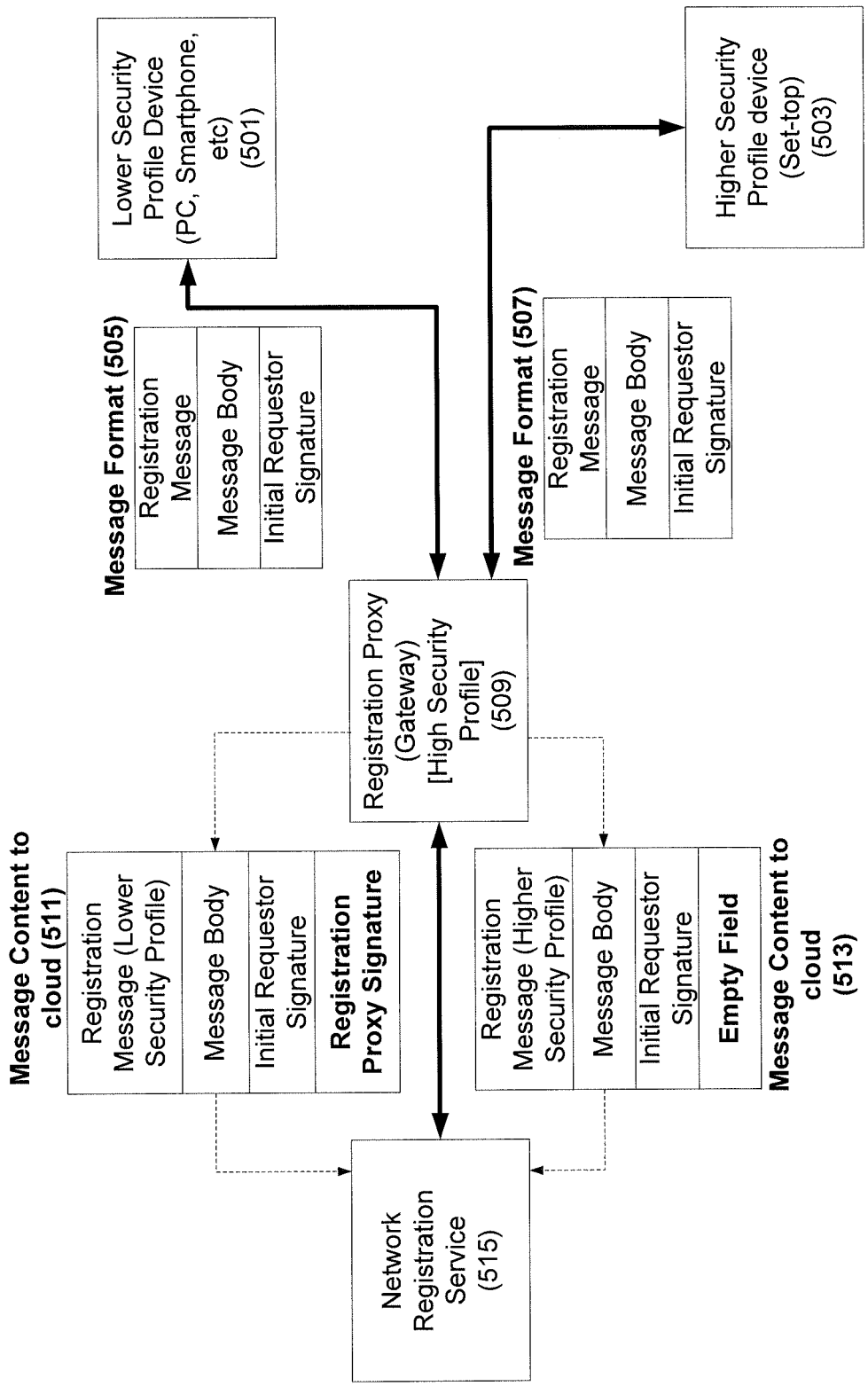
FIG. 5 shows a diagram of a device authentication and/or binding process in accordance with various aspects of the disclosure.

FIG. 5 shows a diagram of a device authentication and/or binding architecture and process in accordance with at least one aspect of the disclosure. FIG. 5 shows a device with a lower security profile (e.g., PC, smartphone, etc.) 501 and a device with a higher security profile (e.g., gateway, set-top box, etc.) 503. Also shown is a first format 505 of a first message (e.g., for registering onto a network) transmitted by the lower security profile device 501 and a second format 507 of a second message transmitted by the higher security profile device 503. Both message 505 and message 507 may include registration details, a message body, and an initial requestor signature. Registration messages 505 and 507 may be transmitted to a registration proxy 509. Because the lower security profile device 501 may not possess an adequate security profile for access to content from a network registration service 515, registration proxy 509 may append, supplement, and/or overlay its signature onto the message 505 initially transmitted from device 501. As shown in message format 511, the initial message format 505 from device 501 may be modified to include the signature of the registration proxy 509. In contrast, because the higher security profile device 503 may possess an adequate security profile for access to content from a network registration service 515, registration proxy 509 may simply pass the message 507 from device 503 to service 515 without appending its own signature to the request, as shown in message format 513. In this way, proxy 509 may either include its own signature on a registration request and/or simply pass a request through to a service 515.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A first device comprising:
one or more processors; and
memory storing instructions that, when executed by the one or more processors, cause the first device to:
determine, for the first device, a first security profile;
determine, for a second device, a second security profile;
receive, from the second device, a first request for content, wherein the first request for content is associated with the second security profile;
determine, based on the second security profile, whether the second device possesses an adequate security profile for access to the content;
generate, based on receiving the first request for the content and based on determining that the second device does not possess the adequate security profile for access to the content, a second request to provide the second device with one or more access privileges associated with the content, wherein the second request comprises:
the first request for the content; and
a digital signature generated based on the first security profile; and
send, to a source of the content, the second request.

2. The first device of claim 1, wherein the instructions, when executed by the one or more processors, further cause the first device to:
receive a response to the second request; and
send, to the second device and in order to enable access to the content by the second device for a predetermined time period, the response, wherein the response is configured to provide the second device a new security profile.

3. The first device of claim 1, wherein the first security profile is based on a physical address associated with the first device.

4. The first device of claim 1, wherein the first security profile is based on a strength of an encryption algorithm used by the first device.

5. The first device of claim 1, wherein the first security profile is based on a structural security of the first device.

6. The first device of claim 1, wherein the first security profile is based on a strength of encrypted seed values used by the first device.

7. A system comprising:
a first device and a second device;
wherein the first device comprises:
one or more first processors; and
first memory storing first instructions that, when executed by the one or more first processors, cause the first device to:
determine, for the first device, a first security profile;
determine, for the second device, a second security profile;
receive, from the second device, a first request for content, wherein the first request for content is associated with the second security profile;
determine, based on the second security profile, whether the second device possesses an adequate security profile for access to the content;
generate, based on receiving the first request for the content and based on determining that the second device does not possess the adequate security profile for access to the content, a second request to provide the second device with one or more access privileges associated with the content, wherein the second request comprises:
the first request for the content; and
a digital signature generated based on the first security profile; and
send, to a source of the content, the second request; and
wherein the second device comprises:
one or more second processors; and
second memory storing second instructions that, when executed by the one or more second processors, cause the second device to:
send the first request for content.

8. The system of claim 7, wherein the first instructions, when executed by the one or more first processors, further cause the first device to:
receive a response to the second request; and
send, to the second device and in order to enable access to the content by the second device for a predetermined time period, the response, wherein the response is configured to provide the second device a new security profile.

9. The system of claim 7, wherein the first security profile is based on a physical address associated with the first device.

10. The system of claim 7, wherein the first security profile is based on a strength of an encryption algorithm used by the first device.

11. The system of claim 7, wherein the first security profile is based on a structural security of the first device.

12. The system of claim 7, wherein the first security profile is based on a strength of encrypted seed values used by the first device.

13. A computing device comprising:
one or more processors; and
memory storing instructions that, when executed by the one or more processors, cause the computing device to:
receive, from a first device, a first request to permit a second device to access content for a first time period, wherein the first request comprises:
a first digital signature associated with a first security profile; and
a second digital signature associated with a second security profile, wherein the second device does not possess an adequate security profile for access to the content;
authenticate, based on the first digital signature, an identity of the first device;
determine, based on the identity, that the first security profile associated with the first device indicates that the first device is permitted to access the content; and
send, to the first device and based on the first device being permitted to access the content, a first credential that permits the second device to access the content for the first time period.

14. The computing device of claim 13, wherein the instructions, when executed by the one or more processors, further cause the computing device to:
receive a second request to permit access to the content by the second device for a second time period after the first time period.

15. The computing device of claim 13, wherein the first security profile is based on a physical address associated with the first device.

16. The computing device of claim 13, wherein the first security profile is based on a strength of an encryption algorithm used by the first device.

17. A system comprising:
a computing device and a first device;
wherein the computing device comprises:
one or more first processors; and
first memory storing first instructions that, when executed by the one or more first processors, cause the computing device to:
receive, from the first device, a first request to permit a second device to access content for a first time period, wherein the first request comprises:
a first digital signature associated with a first security profile; and
a second digital signature associated with a second security profile, wherein the second device does not possess an adequate security profile for access to the content;
authenticate, based on the first digital signature, an identity of the first device;
determine, based on the identity, that the first security profile associated with the first device indicates that the first device is permitted to access the content; and
send, to the first device and based on the first device being permitted to access the content, a first credential that permits the second device to access the content for the first time period; and
wherein the first device comprises:
one or more second processors; and
second memory storing second instructions that, when executed by the one or more second processors, cause the first device to:
receive the first credential.

18. The system of claim 17, wherein the first instructions, when executed by the one or more first processors, further cause the computing device to:
receive a second request to permit access to the content by the second device for a second time period after the first time period.

19. The system of claim 17, wherein the first security profile is based on a physical address associated with the first device.

20. The system of claim 17, wherein the first security profile is based on a strength of an encryption algorithm used by the first device.

* * * * *

UNITED STATES PATENT AND TRADEMARK OFFICE
CERTIFICATE OF CORRECTION

| | |
|---|---|
| PATENT NO. | : 11,799,663 B2 |
| APPLICATION NO. | : 17/006035 |
| DATED | : October 24, 2023 |
| INVENTOR(S) | : Fahrny et al. |

It is certified that error appears in the above-identified patent and that said Letters Patent is hereby corrected as shown below:

In the Specification

Column 6, Line 41:
Delete "ITS," and insert --IIS,--

Signed and Sealed this
Tenth Day of December, 2024

Katherine Kelly Vidal
*Director of the United States Patent and Trademark Office*